United States Patent
Nicolaisen et al.

(10) Patent No.: US 6,504,595 B2
(45) Date of Patent: Jan. 7, 2003

(54) LCD CONNECTION

(75) Inventors: Claus Nicolaisen, Copenhagen (DK); Morten Saxboel, Dragoer (DK); Benny Matthiassen, Roskilde (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/942,674

(22) Filed: Aug. 31, 2001

(65) Prior Publication Data

US 2002/0047979 A1 Apr. 25, 2002

(30) Foreign Application Priority Data

Aug. 31, 2000 (GB) ................................ 0021447

(51) Int. Cl.[7] .......................................... G02F 1/1345
(52) U.S. Cl. ....................................... 349/149; 349/152
(58) Field of Search ............................... 349/149, 150, 349/151, 152, 58

(56) References Cited

U.S. PATENT DOCUMENTS

| | | | |
|---|---|---|---|
| 5,057,025 A | * 10/1991 | Klatt et al. | 439/71 |
| 5,270,848 A | 12/1993 | Takabayashi et al. | 359/88 |
| 5,573,435 A | 11/1996 | Grabbe et al. | 439/862 |
| 5,746,607 A | 5/1998 | Bricaud et al. | 439/66 |
| 5,888,076 A | 3/1999 | Itoh et al. | 439/74 |
| 6,025,644 A | * 2/2000 | Imaeda | 257/723 |
| 6,031,590 A | 2/2000 | Kim | 349/86 |
| 6,265,986 B1 | * 7/2001 | Oka et al. | 340/815.52 |

FOREIGN PATENT DOCUMENTS

| | | |
|---|---|---|
| EP | 0849842 | 6/1998 |
| EP | 0878840 | 11/1998 |
| WO | 97/45893 | 12/1997 |

OTHER PUBLICATIONS

English language Japanese Patent Abstract JP07037936.
English language Japanese Patent Abstract JP10082993.
English language Japanese Patent Abstract JP10153789.

* cited by examiner

Primary Examiner—William L. Sikes
Assistant Examiner—P. R. Akkapeddi
(74) Attorney, Agent, or Firm—Antonelli, Terry, Stout & Kraus, LLP

(57) ABSTRACT

The invention concerns an LCD connection for a communication unit to connect an LCD to PCB. The connection includes several parts to make the connection between the LCD and the PCB reliable, but still easy and cheap to assembly. It is also easy to dismantle since the connector is neither fixed mounted to the LCD nor to the PCB. The connector includes an LCD covered with an Indium Tin Oxide (ITO) pad, an Anisotropic Conductive Foil (ACF) layer on top of the ITO pad, at least one Double Flexible Printed Circuit (DFPC) located on the ACF layer, a spring connector and a PCB. The invention also includes a method for connecting an LCD to a PCB.

13 Claims, 4 Drawing Sheets

LCD CONNECTION

BACKGROUND OF THE INVENTION

1. Field of the Invention

The invention relates to a Liquid Crystal Display (LCD) connection for connecting an LCD to a printed circuit board (PCB) in a communication unit.

2. Description of Prior Art

A connection between an LCD and a PCB in a communication unit is in many cases exposed to mechanical and other stresses, and specially when located in a communication unit that stress can be harmful to the connection between the LCD and the PCB. This is due to how a user handles his/her communication unit. It is not unusual that it is handled quite roughly and it might easily be dropped and thereby exposing the connection to stress. To reduce the of cost of assembling a communication unit it should be easy to assemble and also be possible to dismantle, which gives another set of demands on the connection between the LCD and the PCB.

In conventional solutions the LCD is provided with indium tin oxide (ITO) pads that electrically connects the LCD to a connector, and through that the connector connects to the PCB. The ITO pads are sensitive to contact with the surrounding and might easily react with the surroundings. One known way to avoid this is to attach the connector directly to the LCD, covering the ITO pads and thereby protecting them. Another solution is to cover the ITO pads with a metal film that protects the ITO pads.

U.S. Pat. No. 5,270,848 shows a liquid crystal apparatus that includes a laminated film made of an ITO film having a surface and a metal film on the surface. The connection electrode has been attached directly to the ITO film.

U.S. Pat. No. 6,025,644 shows a liquid crystal display device having input connection terminals connecting to output connection terminals using an Anisotropic conductive film (ACF) as binding. The output connection terminals are connected to a flexible printed circuit (FPC) using an elastic connector, i.e. a rubber connector. The FPC is connected to a PCB by inserting one end of the FPC into a connector on the PCB.

There are many ways to solve the connection problem between an LCD and a PCB, like having a fixed connection that can withstand any mechanical or other stress, but in most cases that will be avoided in the assembly of electronic products. The cost of assembling a fixed connection is too high.

SUMMARY OF THE INVENTION

An object of the invention is to provide an LCD connection for connecting an LCD to a PCB in a communication unit that allows the communication unit to be exposed to mechanical and other stresses while maintaining contact between the LCD and the PCB.

According to the claimed invention this objective is obtained by an LCD connection including an LCD provided with a plurality of connecting pads, a PCB is also provided with a plurality of connecting pads and a connector connecting said LCD to said PCB, where said connector includes springy metal parts between the connecting pads to establish contact with the LCD and the PCB.

Another object of the invention is to provide an LCD assembly for a communication unit that can easily be mounted and dismantled, but still remain reliable.

According to the claimed invention this objective is obtained by an LCD connection including an LCD having Indium Tin Oxide (ITO) pads covered by an Anisotropic Conductive Foil (ACF) layer, Double Flexible Printed Circuits (DFPC), a spring connector having springy metal ends and a PCB, where the spring connector is flexibly mounted on a lightguide that holds the LCD and the PCB together.

Yet another objective of the claimed invention is to provide a method for connecting an LCD to a PCB in a communication unit.

According to the claimed invention this objective is obtained by using a connector that is flexibly mounted between the LCD and the PCB and having conductive layer applied on the LCD to create a reliable connection.

BRIEF DESCRIPTION OF THE DRAWING

The invention will be explained more fully below, by way of example, in connection with preferred embodiments and with reference to drawing, in which.

DETAILED DESCRIPTION OF EMBODIMENTS

Figure 1:
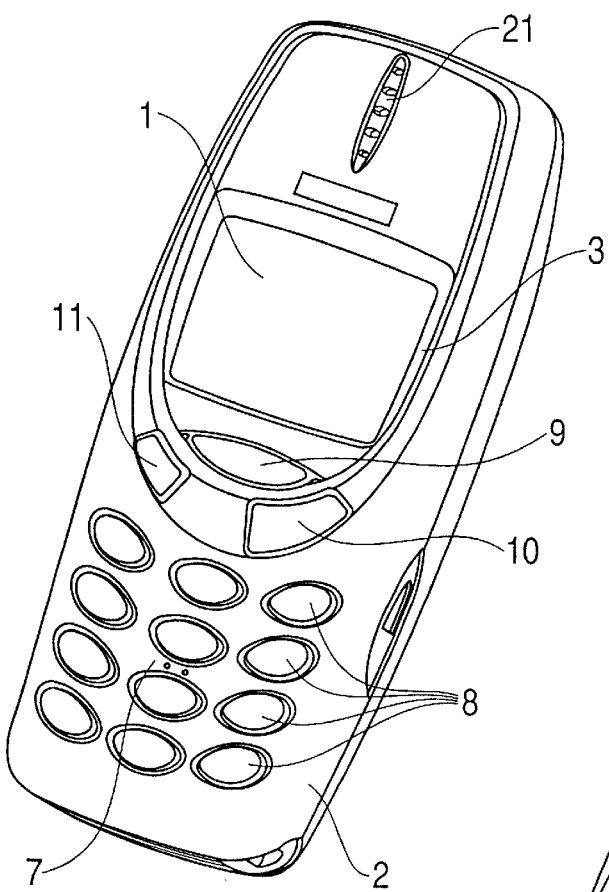
FIGS. 1–2 shows in a perspective view a preferred embodiment of the communication unit according to the invention.
Figure 2:
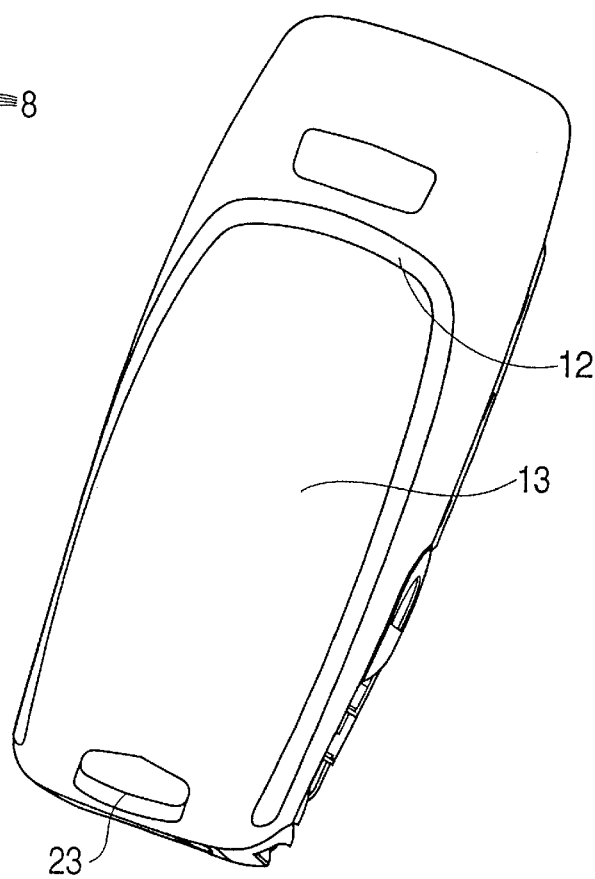

According to a first aspect the LCD connection according to the invention will be described with reference to a hand portable phone, preferably a cellular/mobile phone. A preferred embodiment of this phone is shown in FIGS. 1 and 2, where a cellular/mobile phone is shown in perspective. As will be seen, the phone is provided with a front cover 2 having a window frame 3 encircling the protection window of the display assembly 1. The cellular/mobile phone comprises a user interface having an on/off button 4, a keypad 7, a battery 14 (not shown), a display/LCD 1, an earpiece 21 and a microphone 22 (not shown). In FIG. 2 the phone is shown from another perspective having back cover 13. There is also shown in FIG. 2 a release device 23 for releasing the back cover 13 from the rest of the phone, and a horseshoe shaped edge 12. The horseshoe shaped recess 12 aims to prevent the user from covering the internal antenna 24 (not shown) placed in the upper part of the phone with his fingers. Any covering of the antenna 24 by the user might disturb the function of the antenna 24. The horseshoe shaped recess 12 is ergonomically designed to make the user place his fingers on it and not on the antenna part of the back cover 13.

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a FIGS. "0–9" or a sign "#" or "*", respectively. In alpha mode each key is associated with a number of letters and special signs used in the text editing.

The keypad 7 additionally comprises a menu selection key 9, a up/down key 10, and a cancel key 11. The functionality of the menu selection key or NaviKey™ 9 depends on the state of the phone. The NaviKey™ 9 is used together with the up/down key 10, where the selection/ navigation is made by the NaviKey™ 9 and the scrolling in the menus is made by the up/down key 10. The functionality of the NaviKey™ 9 changes depending on the menus and its present functionality is shown in separate fields in the display 1 just above the NaviKey™ 9. The cancel key 11 is used to delete an input or cancel the last selection and jump to another menu level.

The menu selection key 9 is placed centrally on the front surface of the phone between the display 1 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 3:
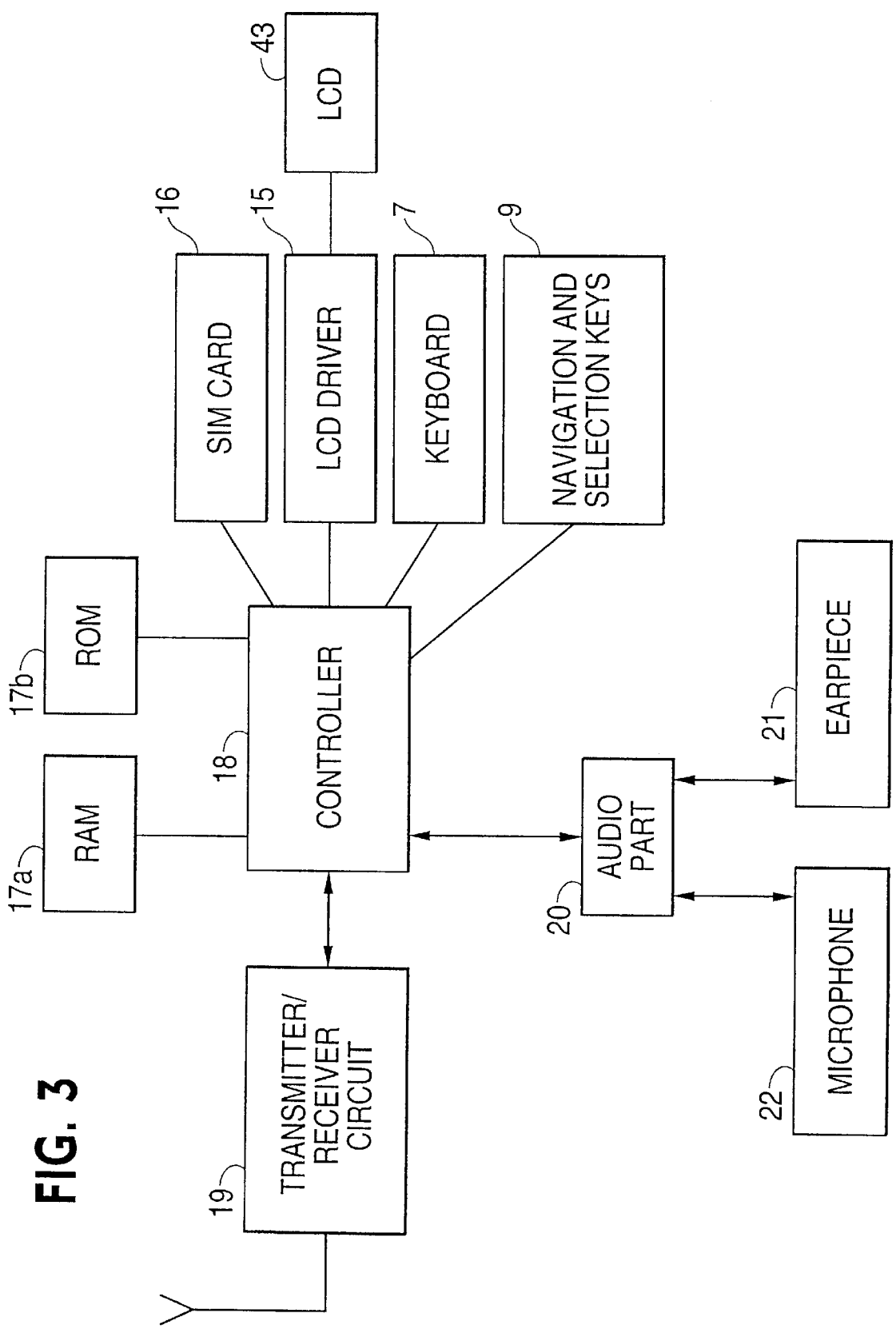
FIG. 3 schematically shows the essential parts of a telephone for communication with a cellular network.

FIG. 3 schematically shows the most important parts of a preferred embodiment of the phone/terminal, said parts being essential to the understanding of the invention. The microphone 22 records the user's speech, and the analogue signals formed thereby are A/D converted in an A/D converter (not shown) before the speech is encoded in an audio part 20. The encoded speech signal is transferred to the controller 18 (physical layer processor), which e.g. supports the GSM terminal software. The controller 18 also forms the interface to the peripheral units of the apparatus, including RAM and ROM memories 17a and 17b, a SIM card 16, the display 1 and the keypad 7 (from FIG. 1) as well as data, power supply, etc. The controller 18 communicates with the transmitter/receiver circuit 19. The audio part 20 speech-decodes the signal, which is transferred from the controller 18 to the earpiece 21 via a D/A converter (not shown).

The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event, when he/she activates the keypad 7 including the menu selection key or keys 9, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

Figure 4:
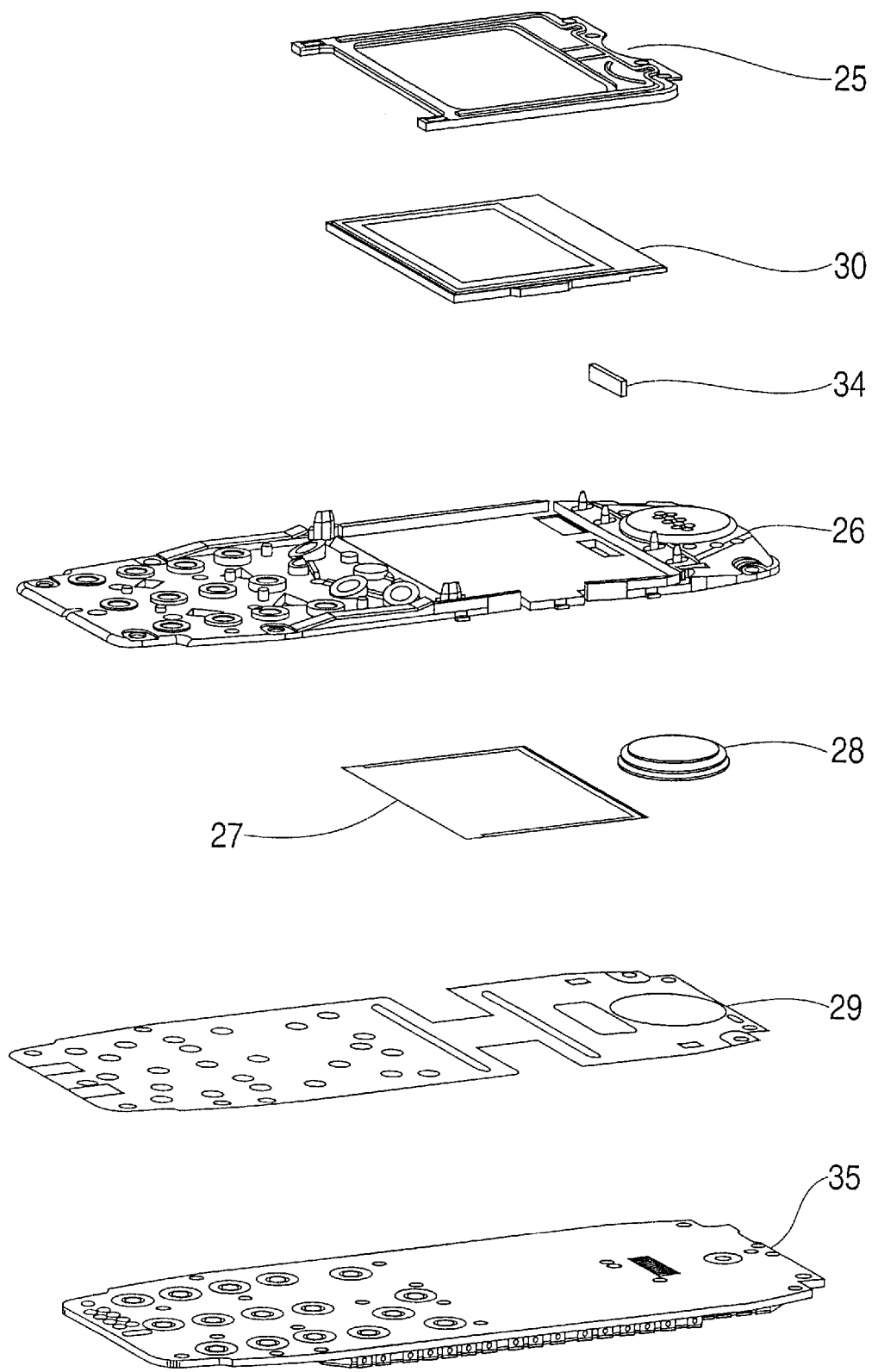
FIG. 4 shows an exploded view of LCD assembly together with a PCB.
Figure 5:
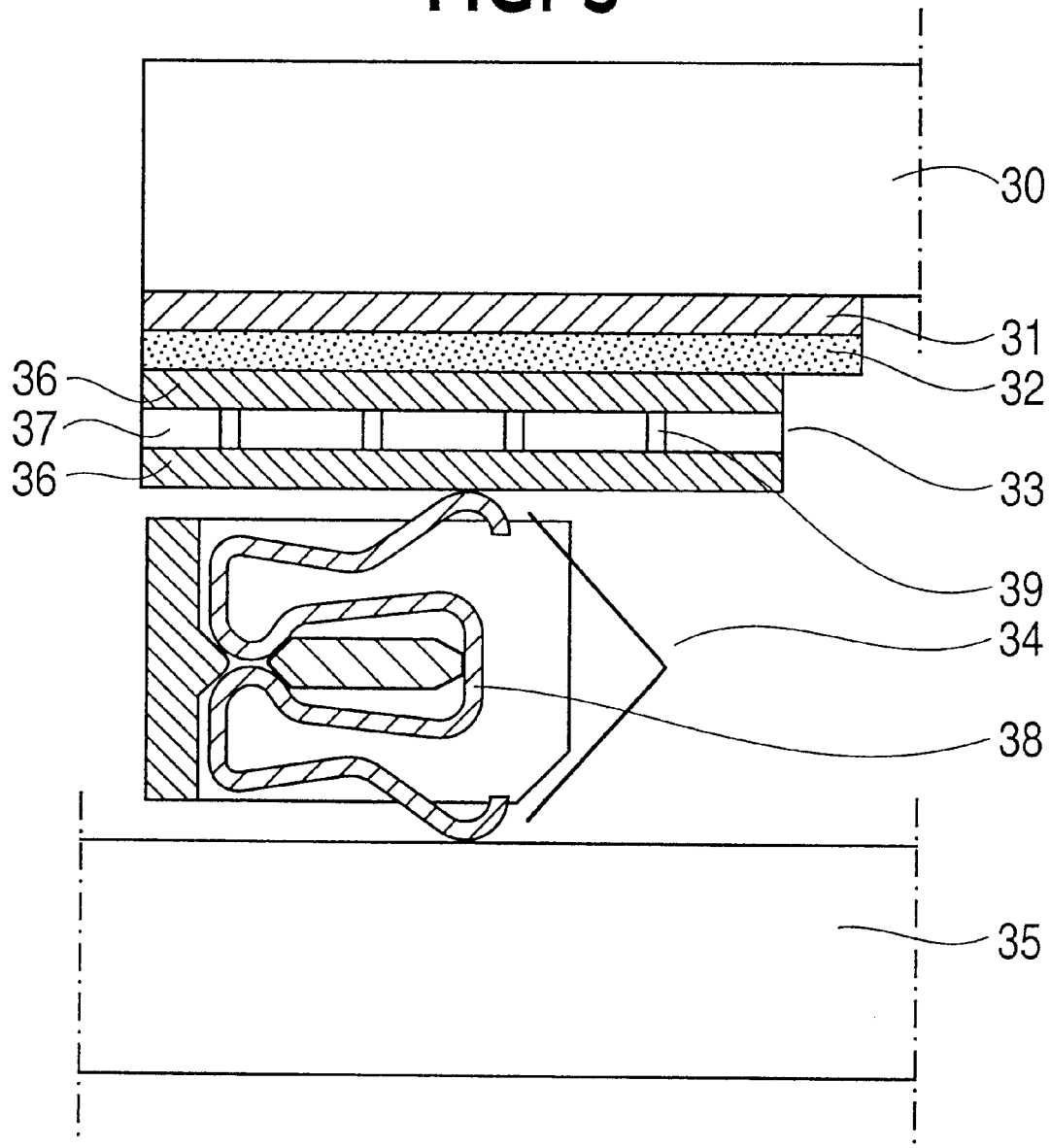
FIG. 5 shows a schematic cross section of an LCD connection according to the invention.

An embodiment of the invention will be described with reference to FIGS. 4 to 5 showing the various features of an LCD connection. In the shown embodiment the LCD connection will be connecting an LCD to a PCB in a communication unit.

In FIG. 4 is an exploded view of an LCD assembly is shown together with a PCB including at least a display frame 25, an LCD 30, a connector 34, a lightguide 26, a reflector 27, a speaker assembly 28, a dome sheet 29 and a PCB 35. The connector 34 that connects the LCD 30 and the PCB 35 to each other is flexibly located in a slot on the lightguide 26.

FIG. 5 shows a cross section of an LCD connection for connecting an LCD 30 to a PCB 35, where the LCD connection includes an LCD 30, Indium Tin Oxide (ITO) pads 31, an Anisotropic Conductive Foil (ACF) layer 32, a Double Flexible Printed Circuits (DFPC) 33, a spring connector 34 and a PCB 35. The cross section showing the LCD connection is not proportional. Instead the included parts have been exaggerated in order to be easily described.

The LCD connection enables the LCD 30 to be electrically connected to the PCB 35 so that the output on the LCD 30 can be transferred from the PCB 35 to the LCD 30. The LCD connection needs to be flexible to withstand stress, while it maintains contact between the LCD 30 and the PCB 35. In the embodiment shown in FIG. 4 this been has achieved by having a connector 34 that is attached neither to the LCD 30 nor to the PCB 35. The connector 34 can thereby move freely to minimise the effect of any stress affecting the communication unit. In FIG. 5 a spring connector 34 is shown having a spring part 38 that preferable is rather extended to keep the spring effect at a maximum. The spring connector has springy metal parts in both ends of the connector. In the shown embodiments the spring part 38 is also the conductive element of the spring connector 34, which is made of gold or a gold-plated metal. Having gold in the conductive element gives a good connection. It is possible to use other types of connectors, e.g. elastic connectors, as shown in one of the prior art document. The spring connector 34 used gives an advantage over elastic connectors, because the spring connector 34 kept its springy characteristics better than an elastic connector does. A connector made of an elastic material will age and loose its springy characteristics over time.

On the LCD 30 the ITO pads 31 have been located with conventional methods, and it is the ITO pads 31 that connects to electrodes on the LCD 30. The ITO pads 31 are sensitive to exposure and might therefore easily get into reaction with the environment. One way to solve this is to attach the connector directly to the ITO pads 31. The ITO pads 31 will thereby be covered and protected by the connector. However this is not the best connection that has been created since it is rather difficult to attach the connector that in most cases are made of gold directly to the ITO pads 31. A gold to gold contact is preferred. In the preferred embodiment therefore the ITO pads 31 have been covered by an ACF 32 that isolates the ITO pads 31. The ACF 32 is also used to bond a DFPC 33 to the ACF 32. It is further used to connect the ITO pads 31 to the DFPC 33 by including small gold balls or pieces in the ACF 32 that connects the ITO pads 31 to the DFPC 33.

The DFPC 33 comprises two conductive layers 36 and a plastic layer 37, where the plastic layer 37 is located between the two conductive layers 36 and holds the two conductive layers 36. The two conductive layers 36, which preferably is made of gold foil, are connected to each other through gold-plated holes 39 in the plastic layer 39. The plastic layer 37 that serves as a holder of the two conductive layers 36 is made of polyimide resin or the like.

The spring connector 34 connects in one end to the DFPC 33 and the other end to the PCB 35 and to the electronic parts on the PCB 35.

The connection between the LCD 30 and the PCB 35 is created by applying an ACF 32 on the ITO pads 31 and on the LCD 30, and in the same step locating the DFPC 33 on the ACF 32. The ACF 32 protects the ITO pads 31 from reaction with the surroundings and binds the DFPC 33, establishing an electric connection between the ITO pads 31 and the DFPC 33. The LCD 30 with the ITO pads 31, the ACF 32 and the DFPC 33 is located in the lightguide 26. Furthermore the spring connector 34 is mounted in a slot on the lightguide 26. Finally the lightguide 26 together with the above mentioned parts are mounted on the PCB 35, and a connection between the LCD and the PCB has been created, by compressing the springy ends of the spring connector 34 towards connecting pads on the LCD 30 and the PCB 35.

The invention is not limited to the above-described examples or to the drawings showing examples of an embodiment, but can be varied within the scope of the appended claims.

What is claimed is:

1. A liquid crystal display (LCD) connection in a communication unit for connecting a liquid crystal display to a printed circuit board (PCB) in the communication unit, the LCD connection comprising:
   a LCD with a plurality of connecting pads;
   a PCB with a plurality of connecting pads; and
   a connector connecting the LCD to the PCB, where the connector has springy metal parts that are located between the connecting pads of the LCD and the PCB to establish flexible contact with the LCD and the PCB; and wherein
   the connecting pads on the LCD are Indium Tin Oxide (ITO) pads, and an Anisotropic Conductive Foil (ACF) layer applied on top of the ITO pads bonds at least one Double Flexible Printed Circuit (DFPC) to the ACF layer.

2. A LCD connection according to claim 1, wherein the ITO pads are located on the LCD having first a ACF layer applied on the ITO pads, and secondly have at least one DFPC attached to the ACF layer.

3. A LCD connection according to claim 1, wherein the DFPC includes two metal layers and one plastic layer, where the plastic layer is located between the two metal layers, the metal layers are one of a gold film or foil, and the plastic layer is made of a polyimide.

4. A LCD connection according to claim 1, wherein the connector between the LCD and PCB is a spring connector having two sets of connecting ends to connect, where the connecting ends are springy and the spring connector is mounted flexibly on a lightguide between the LCD and the PCB, and the lightguide holds the LCD and the PCB together and compresses the springy ends of the connector against the connecting pads.

5. A LCD connection according to claim 2, wherein the DFPC includes two metal layers and one plastic layer, where the plastic layer is located between the two metal layers, the metal layers are one of a gold film or foil, and the plastic layer is made of a polyimide.

6. A LCD connection according to claim 2, wherein the connector between the LCD and PCB is a spring connector having two sets of connecting ends to connect, where the connecting ends are springy and the spring connector is mounted flexibly on a lightguide between the LCD and the PCB, and where the lightguide holds the LCD and the PCB together and compresses the springy ends of the connector against the connecting pads.

7. A LCD connection according to claim 3, wherein the connector between the LCD and PCB is a spring connector having two sets of connecting ends to connect, where the connecting ends are springy and the spring connector is mounted flexibly on a lightguide between the LCD and the PCB, and the lightguide holds the LCD and the PCB together and compresses the springy ends of the connector against the connecting pads.

8. A LCD connection according to claim 4, wherein the connecting ends of the spring connector are made of gold or gold-plated metal.

9. A LCD connection according to claim 5, wherein the connector between the LCD and the PCB is a spring connector having connecting ends and the connecting ends of the spring connector are made of gold or gold-plated metal.

10. A LCD connection according to claim 6, wherein the connecting ends of the spring connector are made of gold or gold-plated metal.

11. A LCD connection according to claim 7, wherein the connecting ends of the spring connector are made of gold or gold-plated metal.

12. A method of connecting a liquid crystal display (LCD) to a printed circuit board (PCB) in a communication unit comprising the steps:
    covering the LCD and the PCB with connecting pads;
    mounting a connecting part in a holder which flexibly connects to the connecting pads of the LCD and the PCB; and
    connecting the LCD to the PCB by pressing the LCD and the PCB together, wherein the connecting part flexibly establishes an electric contact between the connecting pads of the LCD and the PCB.

13. A method of connecting a LCD to a printed circuit board according to claim 12, wherein the connecting pads on the LCD are indium tin oxide (ITO) pads covered by an Anisotropic Conductive Foil (ACF), where the ACF bonds at least one double flexible printed circuit (DFCP), and the ACF establishes an electric connection between the ACF and the ITO pads, and the ACF locates the LCD with the ITO, and the ACF and DFCP on a lightguide, mounts the connecting part comprising a spring in a slot, and mounts the lightguide with the LCD located thereon to the PCB.

* * * * *